United States Patent
Paduroiu et al.

(10) Patent No.: US 11,599,293 B2
(45) Date of Patent: Mar. 7, 2023

(54) CONSISTENT DATA STREAM REPLICATION AND RECONSTRUCTION IN A STREAMING DATA STORAGE PLATFORM

(71) Applicant: EMC IP Holding Company LLC, Hopkinton, MA (US)

(72) Inventors: Andrei Paduroiu, Bellevue, WA (US); Igor Medvedev, Seattle, WA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 165 days.

(21) Appl. No.: 17/070,029

(22) Filed: Oct. 14, 2020

(65) Prior Publication Data

US 2022/0113871 A1    Apr. 14, 2022

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01); *G06F 3/0653* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | |
|---|---|---|
| 3,617,587 A | 11/1971 | Nayar et al. |
| 5,826,977 A | 10/1998 | Fowler et al. |
| 7,340,690 B2 | 3/2008 | Lau |
| 7,430,570 B1 | 9/2008 | Srinivasan et al. |
| 7,610,437 B2 | 10/2009 | Sinclair et al. |

(Continued)

FOREIGN PATENT DOCUMENTS

| | | |
|---|---|---|
| CA | 2 534 170 A1 | 7/2007 |
| CA | 2672879 | 4/2008 |

(Continued)

OTHER PUBLICATIONS

Notice of Allowance dated Jun. 28, 2021 for U.S. Appl. No. 16/884,647, 39 pages.

(Continued)

*Primary Examiner* — Arpan P. Savla
*Assistant Examiner* — Edmund H Kwong
(74) *Attorney, Agent, or Firm* — Amin, Turocy & Watson, LLP

(57) ABSTRACT

The described technology is generally directed towards consistently replicating and reconstructing a data stream made up of a dynamic set of (ordered) segments into a different location (e.g., cluster) from the one in which the stream was created. The technology facilitates consistently and generally continuously and replicating a stream of events ingested in a source cluster to a target cluster for consumption (reading). As stream data segments are replicated to a target cluster by a replicator which is not guaranteed to keep the replicated data consistent, a target controller reconstructs the replicated data stream up to a stream cut point at which the replicated data has been sufficiently replicated so as to be consistent. Reading of the replicated data stream is limited to a view up to the stream cut point; as more data is replicated, additional data up to a later stream cut point becomes available for reading.

20 Claims, 14 Drawing Sheets

(56) References Cited

U.S. PATENT DOCUMENTS

| | | | |
|---|---|---|---|
| 7,769,717 B2 * | 8/2010 | Federwisch | H04L 67/1095 |
| | | | 707/649 |
| 7,984,084 B2 | 7/2011 | Sinclair | |
| 8,285,918 B2 | 10/2012 | Maheshwari | |
| 8,443,263 B2 | 5/2013 | Selinger et al. | |
| 8,572,091 B1 | 10/2013 | Sivasubramanian et al. | |
| 8,655,825 B2 | 2/2014 | Roesch et al. | |
| 8,732,403 B1 | 5/2014 | Nayak | |
| 8,825,848 B1 | 9/2014 | Dotan et al. | |
| 8,873,284 B2 | 10/2014 | Sinclair et al. | |
| 8,984,248 B2 | 3/2015 | Morishita et al. | |
| 9,223,693 B2 | 12/2015 | Sinclair et al. | |
| 9,336,133 B2 | 5/2016 | Sinclair et al. | |
| 9,348,746 B2 | 5/2016 | Sinclair et al. | |
| 9,407,521 B1 | 8/2016 | Kulkarni | |
| 9,465,731 B2 | 10/2016 | Sinclair et al. | |
| 9,514,018 B2 | 12/2016 | Sikri | |
| 9,591,316 B2 | 3/2017 | Bracha et al. | |
| 9,639,589 B1 | 5/2017 | Theimer et al. | |
| 9,715,434 B1 | 7/2017 | Xu et al. | |
| 9,734,050 B2 | 8/2017 | Sinclair et al. | |
| 9,734,911 B2 | 8/2017 | Sinclair et al. | |
| 9,753,932 B1 | 9/2017 | Brow et al. | |
| 9,778,855 B2 | 10/2017 | Sinclair | |
| 9,892,803 B2 | 2/2018 | Reed | |
| 9,898,482 B1 | 2/2018 | Bono | |
| 9,965,215 B1 | 5/2018 | Vazhenin et al. | |
| 10,108,543 B1 | 10/2018 | Duggal et al. | |
| 10,108,544 B1 | 10/2018 | Duggal et al. | |
| 10,120,613 B2 | 11/2018 | Sinclair et al. | |
| 10,133,490 B2 | 11/2018 | Sinclair et al. | |
| 10,255,179 B2 | 4/2019 | Ji et al. | |
| 10,338,834 B1 * | 7/2019 | Dighe | G06F 3/0659 |
| 10,430,279 B1 | 10/2019 | Dittia et al. | |
| 10,565,208 B2 | 2/2020 | Triou, Jr. et al. | |
| 10,628,424 B2 | 4/2020 | Park et al. | |
| 10,705,741 B1 * | 7/2020 | Varadarajan | G06F 16/215 |
| 10,795,812 B1 | 10/2020 | Duggal et al. | |
| 10,860,457 B1 | 12/2020 | Evenson et al. | |
| 10,867,033 B2 | 12/2020 | Keren et al. | |
| 10,891,228 B2 | 1/2021 | Burow | |
| 10,983,715 B2 | 4/2021 | Sharoni et al. | |
| 11,016,826 B2 | 5/2021 | Lehmann | |
| 11,086,537 B2 | 8/2021 | Byun | |
| 11,194,638 B1 | 12/2021 | Danilov et al. | |
| 11,314,779 B1 | 4/2022 | Jain | |
| 11,354,054 B2 | 6/2022 | Danilov et al. | |
| 2004/0199524 A1 | 10/2004 | Rys et al. | |
| 2005/0025152 A1 | 2/2005 | Georgiou et al. | |
| 2005/0055519 A1 | 3/2005 | Stuart et al. | |
| 2006/0036568 A1 | 2/2006 | Moore et al. | |
| 2006/0058987 A1 | 3/2006 | Kumar et al. | |
| 2007/0033325 A1 | 2/2007 | Sinclair et al. | |
| 2007/0047635 A1 | 3/2007 | Stojanovic et al. | |
| 2007/0220518 A1 | 9/2007 | Verbowski et al. | |
| 2008/0059724 A1 | 3/2008 | Stifter, Jr. | |
| 2008/0082596 A1 | 4/2008 | Gorobets | |
| 2008/0144079 A1 | 6/2008 | Pandey et al. | |
| 2008/0184262 A1 | 7/2008 | Ginis et al. | |
| 2008/0189477 A1 | 8/2008 | Asano et al. | |
| 2008/0288713 A1 | 11/2008 | Lee et al. | |
| 2008/0301135 A1 | 12/2008 | Alves et al. | |
| 2009/0182784 A1 | 7/2009 | Rohit et al. | |
| 2010/0083098 A1 | 4/2010 | Leme et al. | |
| 2010/0088296 A1 | 4/2010 | Periyagaram et al. | |
| 2010/0077013 A1 | 5/2010 | Clements et al. | |
| 2010/0125553 A1 | 5/2010 | Huang et al. | |
| 2010/0125794 A1 | 5/2010 | Hampton et al. | |
| 2010/0174881 A1 | 7/2010 | Anglin et al. | |
| 2010/0205163 A1 * | 8/2010 | Eshghi | G06F 11/1453 |
| | | | 707/698 |
| 2010/0281081 A1 | 11/2010 | Stager et al. | |
| 2010/0333116 A1 | 12/2010 | Prahlad et al. | |
| 2011/0126099 A1 | 5/2011 | Anderson et al. | |
| 2011/0131588 A1 | 6/2011 | Allam et al. | |
| 2011/0145473 A1 | 6/2011 | Maheshwari | |
| 2011/0161784 A1 | 6/2011 | Selinger et al. | |
| 2011/0249147 A1 | 10/2011 | Ishii | |
| 2012/0102503 A1 | 4/2012 | Meijer et al. | |
| 2012/0109985 A1 | 5/2012 | Chandrasekaran | |
| 2012/0151014 A1 | 6/2012 | Gokhale et al. | |
| 2012/0198027 A1 | 8/2012 | Hetzler et al. | |
| 2012/0259994 A1 | 10/2012 | Gillies et al. | |
| 2013/0226931 A1 | 8/2013 | Hazel et al. | |
| 2013/0275808 A1 | 10/2013 | McNeeney et al. | |
| 2014/0006465 A1 | 1/2014 | Davis et al. | |
| 2014/0089264 A1 | 3/2014 | Talagala et al. | |
| 2014/0223115 A1 | 8/2014 | Dinkjian et al. | |
| 2014/0325148 A1 | 10/2014 | Choi et al. | |
| 2014/0365719 A1 | 12/2014 | Kuzmin et al. | |
| 2015/0169449 A1 | 6/2015 | Barrell et al. | |
| 2015/0172120 A1 | 6/2015 | Dwarampudi et al. | |
| 2015/0205816 A1 | 7/2015 | Periyagaram et al. | |
| 2015/0227602 A1 | 8/2015 | Ramu et al. | |
| 2015/0261776 A1 | 9/2015 | Attarde et al. | |
| 2015/0341212 A1 | 11/2015 | Hsiao et al. | |
| 2015/0355862 A1 | 12/2015 | Hayes et al. | |
| 2015/0363245 A1 | 12/2015 | Mutschler | |
| 2016/0042008 A1 | 2/2016 | Tripathy et al. | |
| 2016/0063080 A1 | 3/2016 | Nano et al. | |
| 2016/0210061 A1 | 7/2016 | Soncodi et al. | |
| 2016/0246713 A1 | 8/2016 | Choi et al. | |
| 2016/0321287 A1 | 11/2016 | Luthra et al. | |
| 2016/0337435 A1 | 11/2016 | Nigam et al. | |
| 2016/0350324 A1 | 12/2016 | Wang et al. | |
| 2016/0357476 A1 | 12/2016 | Chen et al. | |
| 2017/0038978 A1 | 2/2017 | Li et al. | |
| 2017/0075832 A1 | 3/2017 | Bhimani et al. | |
| 2017/0075947 A1 | 3/2017 | Kurilov et al. | |
| 2017/0123655 A1 | 5/2017 | Sinclair et al. | |
| 2017/0177249 A1 | 6/2017 | Kurilov et al. | |
| 2017/0177263 A1 | 6/2017 | Das et al. | |
| 2017/0177546 A1 | 6/2017 | Heinz et al. | |
| 2017/0212891 A1 | 7/2017 | Pundir et al. | |
| 2017/0213127 A1 | 7/2017 | Duncan | |
| 2017/0255392 A1 * | 9/2017 | Nakashima | G06F 3/0673 |
| 2017/0289214 A1 | 10/2017 | Cho et al. | |
| 2018/0101842 A1 | 4/2018 | Ventura et al. | |
| 2018/0121307 A1 | 5/2018 | Braun et al. | |
| 2018/0146018 A1 | 5/2018 | Chang et al. | |
| 2018/0176244 A1 | 6/2018 | Gervais et al. | |
| 2018/0184138 A1 | 6/2018 | Shaw et al. | |
| 2018/0189175 A1 | 6/2018 | Ji et al. | |
| 2018/0314727 A1 | 11/2018 | Epstein et al. | |
| 2018/0329644 A1 | 11/2018 | Das et al. | |
| 2018/0332325 A1 | 11/2018 | Kaitchuck | |
| 2018/0332365 A1 | 11/2018 | Kaitchuck et al. | |
| 2018/0332366 A1 | 11/2018 | Paduroiu | |
| 2018/0332367 A1 | 11/2018 | Kaitchuck et al. | |
| 2018/0336256 A1 | 11/2018 | Li et al. | |
| 2018/0345140 A1 | 12/2018 | Posin | |
| 2019/0004863 A1 | 1/2019 | Mainali et al. | |
| 2019/0026301 A1 | 1/2019 | Wang et al. | |
| 2019/0057138 A1 | 2/2019 | Knowles et al. | |
| 2019/0129806 A1 * | 5/2019 | Hsu | G06F 3/0641 |
| 2019/0138494 A1 | 5/2019 | Inoue | |
| 2019/0197173 A1 * | 6/2019 | Tahara | G06F 3/065 |
| 2019/0278849 A1 | 9/2019 | Chandramouli et al. | |
| 2019/0327297 A1 | 10/2019 | Madani | |
| 2019/0332318 A1 | 10/2019 | Gooding et al. | |
| 2019/0340180 A1 | 11/2019 | Barsness et al. | |
| 2019/0349422 A1 | 11/2019 | Dhruvakumar et al. | |
| 2020/0034468 A1 | 1/2020 | Lei et al. | |
| 2020/0089420 A1 | 3/2020 | Sharoni et al. | |
| 2020/0174695 A1 | 6/2020 | Bazarsky et al. | |
| 2020/0250172 A1 | 8/2020 | Busjaeger et al. | |
| 2020/0310686 A1 | 10/2020 | Truong et al. | |
| 2020/0320005 A1 | 10/2020 | Shulman et al. | |
| 2020/0344299 A1 | 10/2020 | Sohail et al. | |
| 2020/0394196 A1 | 12/2020 | Shivanna et al. | |
| 2020/0404011 A1 | 12/2020 | Gervais et al. | |
| 2021/0110328 A1 | 4/2021 | Hsiao et al. | |
| 2021/0124746 A1 | 4/2021 | Klaedtke | |
| 2021/0157520 A1 * | 5/2021 | Bavishi | G06F 13/28 |

(56) References Cited

U.S. PATENT DOCUMENTS

| | | | |
|---|---|---|---|
| 2021/0256029 | A1 | 8/2021 | Danilov et al. |
| 2021/0342296 | A1 | 11/2021 | Danilov et al. |
| 2021/0342354 | A1 | 11/2021 | Danilov et al. |
| 2021/0365211 | A1 | 11/2021 | Danilov et al. |
| 2021/0374021 | A1 | 12/2021 | Santhakumar et al. |
| 2022/0035533 | A1 | 2/2022 | Danilov et al. |
| 2022/0182724 | A1 | 6/2022 | Gupta et al. |

FOREIGN PATENT DOCUMENTS

| | | |
|---|---|---|
| CN | 1708029 | 12/2005 |
| CN | 104901958 | 9/2015 |
| CN | 105591926 | 5/2016 |
| GB | 2377038 | 12/2002 |
| WO | 2002101585 | 12/2002 |
| WO | 2004/080067 A1 | 9/2004 |
| WO | 2009014993 | 1/2009 |
| WO | 2015/196281 A1 | 12/2015 |
| WO | 2015191120 | 12/2015 |
| WO | 2018148149 | 8/2018 |

OTHER PUBLICATIONS

Office Action dated Jun. 29, 2021 for U.S. Appl. No. 16/881,556, 24 pages.

Office Action dated Jan. 29, 2021 for U.S. Appl. No. 16/256,083, 42 pages.

Notice of Allowance dated Aug. 4, 2021 for U.S. Appl. No. 17/200,652, 51 pages.

Office Action dated Apr. 20, 2022 for U.S. Appl. No. 16/944,094, 48 pages.

M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).

Notice of Allowance dated Apr. 27, 2022 for U.S. Appl. No. 17/127,724, 19 pages.

Office Action dated May 24, 2022 for U.S. Appl. No. 17/237,535, 62 pages.

Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).

Office Action dated Mar. 21, 2022 for U.S. Appl. No. 16/864,905, 125 pgs.

Edi Muskardin et al., "Implementation of Hashing Algorithms in Stream Mining", International Conference on Smart Systems and Technologies (SST), Oct. 2018 , pp. 233-238.

Notice of Allowance dated Apr. 11, 2022 for U.S. Appl. No. 16/944,089, 87 pages.

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154 (Year: 2014).

Office Action dated Apr. 12, 2022 for U.S. Appl. No. 17/038,102, 48 pages.

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/ ]. The Apache Software Foundation. Copyright 2020, retrieved Aug. 26, 2020, 2 pages.

Office Action dated Oct. 1, 2021 for U.S. Appl. No. 17/127,724, 41 pages.

Notice of Allowance dated Dec. 15, 2021 for U.S. Appl. No. 17/064,747, 54 pages.

Office Action dated Nov. 10, 2021 for U.S. Appl. No. 16/944,089, 75 pages.

Kleppmann, Making Sense of Stream Processing—The Philosophy Behind Apache Kafka and Scalable Stream Data Platforms; Mar. 4, 2016; retrieved from [https://hashingit.com/elements/research-resources/2016-03-04-making-sense-of-stream-processing.pdf] on Nov. 5, 2021, (Year: 2016), 183 pages.

Notice of Allowance dated Feb. 4, 2022 for U.S. Appl. No. 16/915,762, 57 pages.

Office Action dated Oct. 1, 2021 for U.S. Appl. No. 16/915,762, 57 pages.

Office Action dated Jan. 21, 2022 for U.S. Appl. No. 16/864,892, 26 pages.

Notice of Allowance dated Feb. 24, 2022 for U.S. Appl. No. 17/038,079, 55pgs.

Azhar et al., "Efficient selection of access control systems through multi criteria analytical hierarchy process", IEEE, doi: 10.1109/ICET.2012.6375419,2012, pp. 1-8. (Year: 2012).

Rox et al., "Construction and Deconstruction of Hierarchical Event Streams with Multiple Hierarchical Layers", IEEE, doi: 10.1109/ECRTS.2008.13, 2008, pp. 201-210. (Year: 2008).

Notice of Allowance dated Feb. 18, 2022 for U.S. Appl. No. 17/083,145, 70 pgs.

Office Action dated Jul. 8, 2022 for U.S. Appl. No. 16/864,892, 33 pages.

Office Action dated Jul. 15, 2022 for U.S. Appl. No. 16/864,905, 77 pages.

Office Action dated Sep. 1, 2022 for U.S. Appl. No. 16/944,094, 25 pages.

(56) References Cited

OTHER PUBLICATIONS

Office Action dated Sep. 30, 2022 for U.S. Appl. No. 17/408,344, 66 pages.
Notice of Allowance dated Aug. 24, 2022 for U.S. Appl. No. 17/152,544, 55 pages.
Office Action dated Sep. 15, 2022 for U.S. Appl. No. 17/383,425, 61 pages.
Phaujdar, "Understanding Event Streams—A Comprehensive Guide 101_ Learn Hevo" [https://hevodata.com/learn/understanding-event-streams/] (Feb. 17, 2021) (Year: 2021).
Dhanushka, "Understanding Kafka Topic Partitions" [https://medium.com/event-driven-utopia/understanding-kafka-topic-partitions-ae40f80552e8]—(Mar. 28, 2021) (Year: 2021).
Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).
Non-Final Office Action received for U.S. Appl. No. 17/063,906, dated Oct. 27, 2022, 59 pages.
Notice of Allowance received for U.S. Appl. No. 16/864,905, dated Nov. 30, 2022, 347 pages.
Tony Tung et al., "Topology Dictionary for 3D Video Understanding", IEEE Transactions on Pattern Analysis and Machine Intelligence (vol. 34, Issue: 8, Aug. 2012), Dec. 2011, pp. 1645-1657.
A. Bulut et al., "Distributed data streams indexing using content-based routing paradigm", 19th IEEE International Parallel and Distributed Processing Symposium, Apr. 2005, pp. 1-10.
Non-Final Office Action received for U.S. Appl. No. 17/152,558, dated Dec. 7, 2022, 59 pages.
Non-Final Office Action received for U.S. Appl. No. 17/223,263, dated Nov. 28, 2022, 64 pages.
Non-Final Office Action received for U.S. Appl. No. 17/337,940, dated Dec. 30, 2022, 68 pages.

\* cited by examiner

CONSISTENT DATA STREAM REPLICATION AND RECONSTRUCTION IN A STREAMING DATA STORAGE PLATFORM

TECHNICAL FIELD

The subject application relates generally to data storage, and, for example, to a technology that replicates data streams in data storage systems that implement data streams for storing and serving continuous and unbounded data, and related embodiments.

BACKGROUND

Contemporary data storage systems, such as DELL EMC's PRAVEGA system/data storage service, store data in a storage abstraction referred to as a stream. A stream is identified with a name, and can store continuous and potentially unbounded data; more particularly, a stream comprises a durable, elastic, append-only, sequence of stored events. New events are added to a tail (front) of a stream, maintained in Tier-1 storage. Older stream data can be aggregated into chunks and written to Tier-2 storage, for example to an object storage system (e.g. Dell EMC's ECS data storage system) or to a file storage system (e.g. DELL EMC's ISILON data storage system).

One stream may be split into a set of shards or partitions generally referred to as stream segments (or simply segments). The segments act as logical containers for events within the stream. When a new event is written to a stream, it is stored to one of the segments based on the event's routing key; event routing keys are hashed to form a "key space," which is divided into a number of partitions, corresponding to the number of segments.

A stream is consigned to the storage cluster on which the stream is created, and that cluster has to accept any events that are appended to that stream. However, there are situations in which the location where the data is written is not necessarily the most appropriate location for readers (event consumers) to consume the data. For example, data may be created at a network edge, but the data may need to be consumed (analyzed) in a core location that has sufficient computational resources to process the data. If there is a need to read stream events from a distant cluster, often with high latency and/or high bandwidth costs, then it may not be feasible to properly analyze that data.

However, replicating a stream to a different cluster (cross-cluster replication) is not able to be done by simply replicating the data within the segments that compose the stream. For one, the Tier-2 portion of any non-sealed segment may contain a partial event at its tail; the rest of the event is in Tier-1 storage, which is off-limits for Tier-2 replication at such a moment, until the rest of the event is eventually copied. A partial event cannot be passed to an event reader, as doing so triggers a data corruption.

Streams can also have distributed transactions for events. Stream transactions are applied atomically to the segments within a stream, and the components that work with the stream (client, segment store and controller) coordinate so that the events within any transaction only become available for reading once the transaction is committed. However, that does not guarantee that the events in a transaction are atomically written to Tier-2 storage, let alone atomically replicated to other clusters, which can trigger a consistency problem.

Further, segments can be scaled based on data ingestion patterns, meaning that the number of segments in a stream at a given time can be automatically increased by splitting a segment into two or more successor segments that evenly split that segment's routing key space, or decreased by merging two or more predecessor segments into a single successor segment. The predecessor-successor relationships are maintained by the controller in its own metadata, which may contain interleaved information about multiple streams, and/or the metadata may be maintained in a format that does not make it easy for consistent replication (or even may not be able to be replicated, e.g., due to the choice of storage media). Such metadata needs to be replicated to reconstruct the stream in a different cluster.

Still further, the actual replication of data stored in Tier-2 is not controlled by the streaming platform, but rather is performed by a storage device/a file transfer tool. In most implementations, such replication is asynchronous, with no guarantee as to which files/objects are replicated first; (the only guarantee provided is consistency within a file/object itself).

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
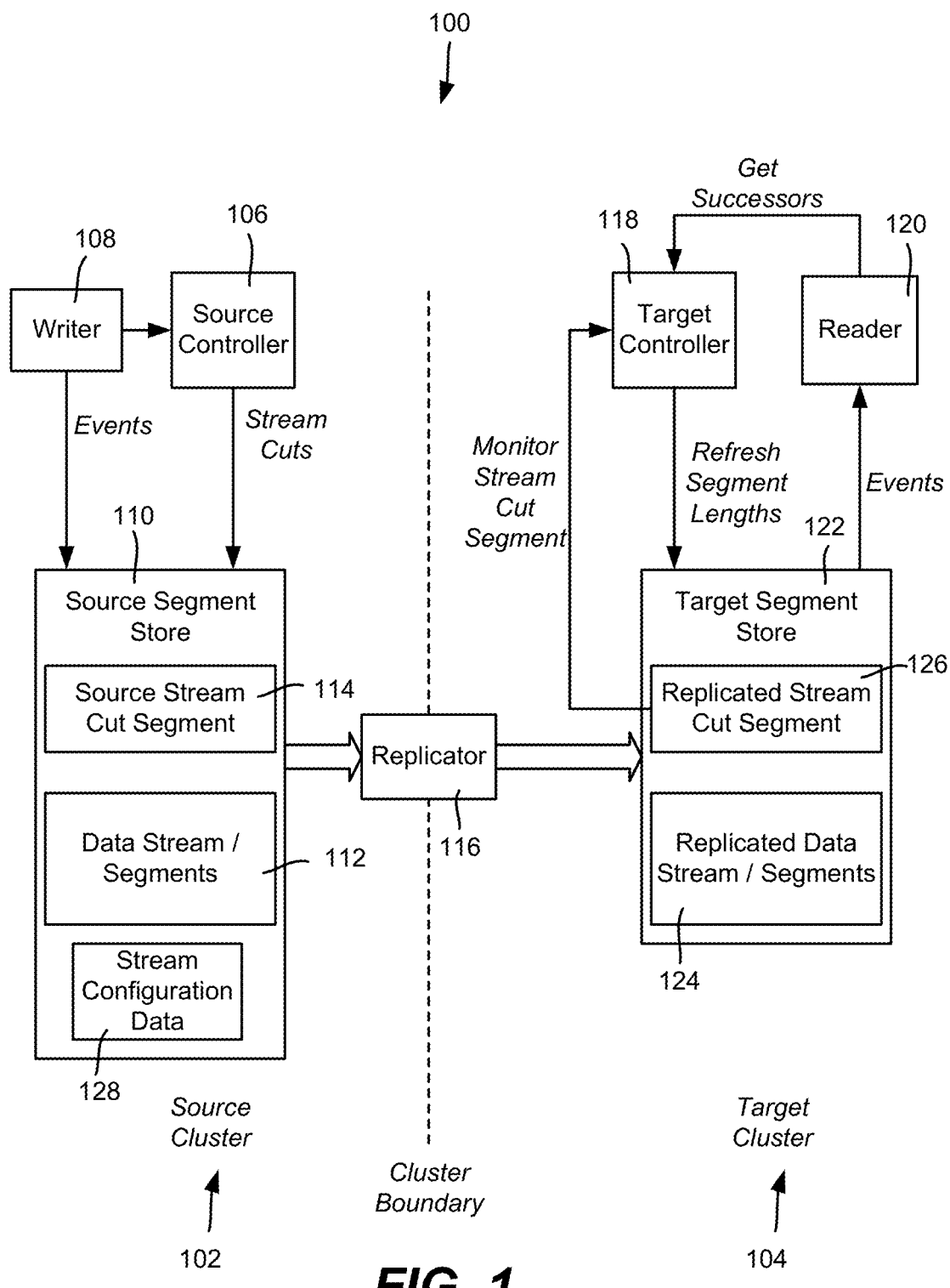
FIG. 1 is a block diagram representation of example components and data-related operations in a streaming data storage system in which a data stream is replicated across clusters in a manner that provides consistent reading of the replicated data stream, in accordance with various aspects and implementations of the subject disclosure

Various aspects of the technology described herein are generally directed towards consistently replicating and reconstructing a stream made up of a dynamic set of (ordered) segments into a different location from the one in which the stream was created. The technology facilitates consistently and (generally) continuously replicating a data stream from one cluster to another, allowing data to be ingested in one such cluster and be available for consumption in any other cluster to which the data stream is replicated (also known as active-passive replication).

As will be understood, the technology is based on stream cuts, made at an event boundary, to define consistent locations within the stream. The technology further uses information from Tier-2 storage (such as segment length), in combination with the stream cuts, to determine how much data (how many events) are made available for reading on the replicated side in a way that ensures consistency of the data.

It should be understood that any of the examples herein are non-limiting. For instance, some of the examples are based on PRAVEGA data storage technology; however virtually any stream-based data storage system may benefit from the technology described herein. As a more particular example, instead of tracking time for each event written in PRAVEGA, a "stream cut object" or simply a "stream cut" refers to a specific position in the data stream that at an event boundary, that is, a stream cut does not split an event's data. For a multi-segment stream, a stream cut is a composite position that "cuts" through the routing key space and partitions the stream in two (one before the stream cut and one after the stream cut). Such a stream cut can be associated with a time value. Other data stream storage systems can use a similar concept, or can use timestamped data; notwithstanding, as will be understood, the technology described herein can be applied to any stream-based data storage mechanism that tracks position/time of stored data. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 that includes a source cluster 102, which is the streaming data storage cluster where a data stream originates, and a target cluster 104, which is the cluster where the data stream needs to be replicated. As described herein, FIG. 1 shows a source controller 106 coupled to an event writer 108 that writes events to a source segment store 110 containing the data stream/data stream's segments 112, along with a source stream cut segment 114 as described herein.

FIG. 1 also shows a replicator 116, comprising any tool or mechanism that copies data from the source cluster 102 to the target cluster 104. Any DELL EMC-provided Tier-2 implementations have such a replicator/replication capability; if another Tier-2 implementation is used that does not have replication capability, an alternative replicator can be a simple file transfer tool that copies data segments and metadata from the source cluster 102 to the target cluster 104.

At the target cluster, a target controller 118 is coupled to an event reader 120 that reads replicated events from a target segment store 122 containing the replicated data stream/data stream's segments 124. A replicated stream cut segment 126 is also present in the target cluster 104 as described herein. Note that at any given time, the replicated data stream/data stream's segments 124 and replicated stream cut segment 126 can be only partially replicated relative to the source stream/data stream's segments 112 and source stream/data stream's segments 114.

Also associated with a data stream is stream configuration data 128. As described herein, at the creation of a stream, part of the stream configuration data 128 is referred to as replication granularity, which can be expressed as a unit of time. The replication granularity instructs the source controller 106 as to how often to generate stream cuts related to replication.

In one implementation, an internal stream cut segment is provided for each stream, shown in FIG. 1 as the stream cut segment 114 for the data stream 112. In one implementation, this stream cut segment 114 cannot be appended to or read directly by a client component. The source controller 106 modifies the stream cut segment 114 based on periodic triggering, including using the replication granularity as the interval, and upon any scaling (scale) event, that is, whenever a segment of the data stream 112 is split or merged.

More particularly, a stream cut SC is generated that contains information for the current tail of the stream, that is, identifiers of the active segments and their lengths. Because only whole events can be in a segment (and implicitly, whole transactions), these stream cuts are guaranteed to be on event boundaries. Note that if a stream cut is generated as a result of a scale event, the predecessor-successor relationship is also recorded in the stream cut segment in conjunction with the generated stream cut.

The source controller 106 appends the stream cut SC (which can include the predecessor-successor relationship if appropriate) to the source stream cut segment 114. Note that because stream cuts are appended to stream cut segment, a stream cut segment theoretically can grow indefinitely. A suitable trimming mechanism can be used to truncate the stream cut segment to keep the size of the stream cut segment practical.

Figure 2:
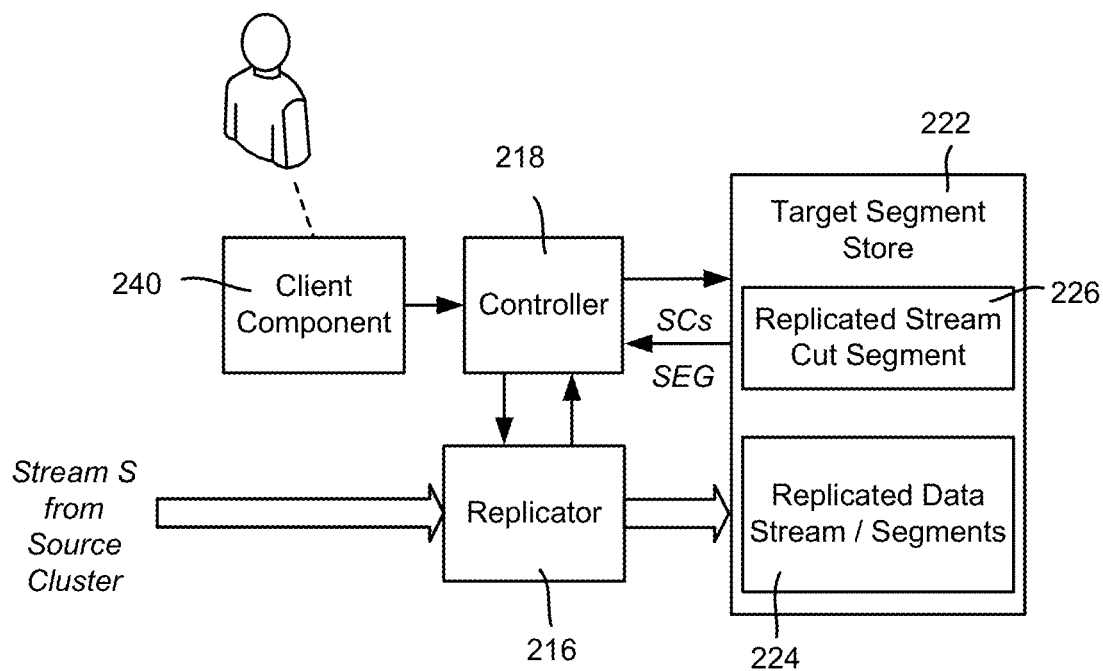
FIG. 2 is a block diagram showing example components and data structures that can be used to consistently reconstruct a replicated data stream, in accordance with various aspects and implementations of the subject disclosure.
Figure 3:
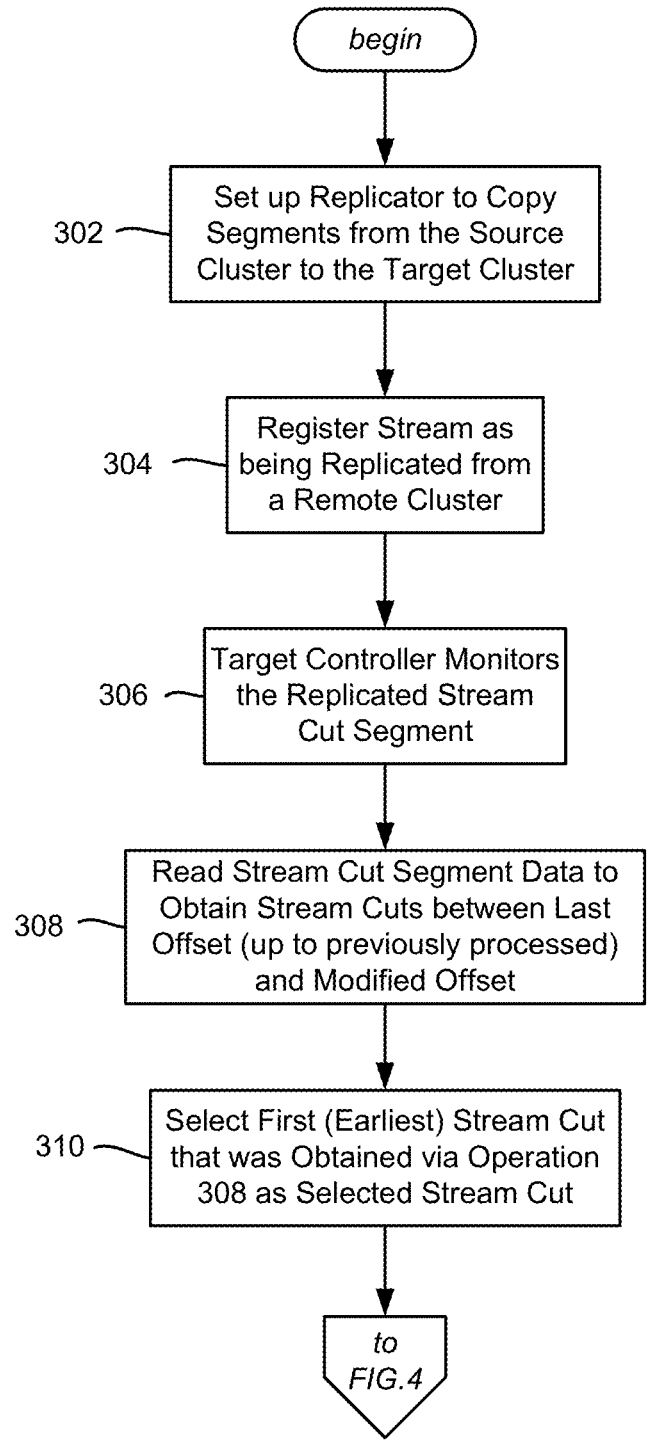
FIGS. 3-5 comprise a flow diagram showing example operations of a target controller to reconstruct a replicated data stream of segments to facilitate consistent reading of the data stream, in accordance with various aspects and implementations of the subject disclosure.
Figure 4:
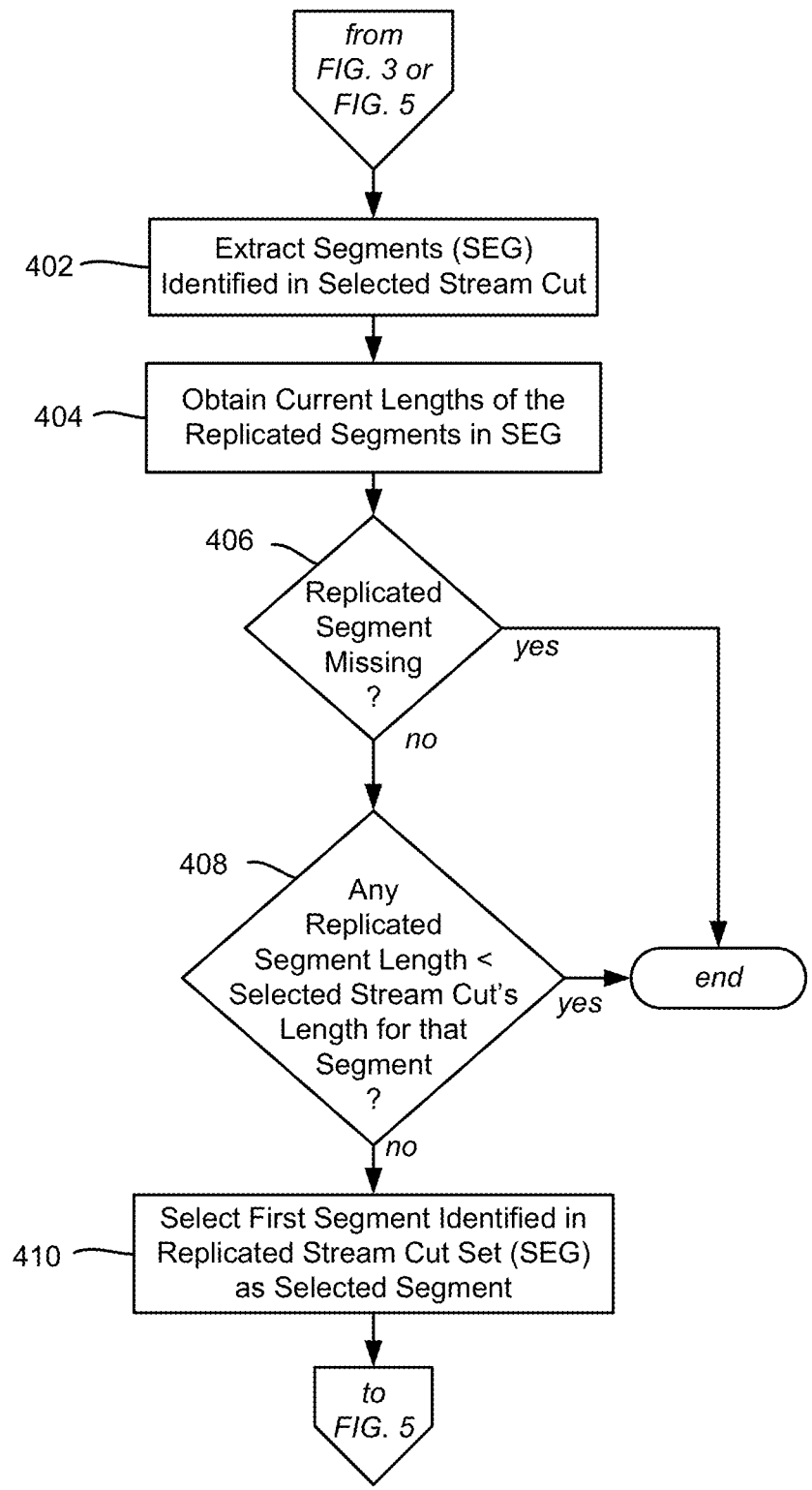
Figure 5:
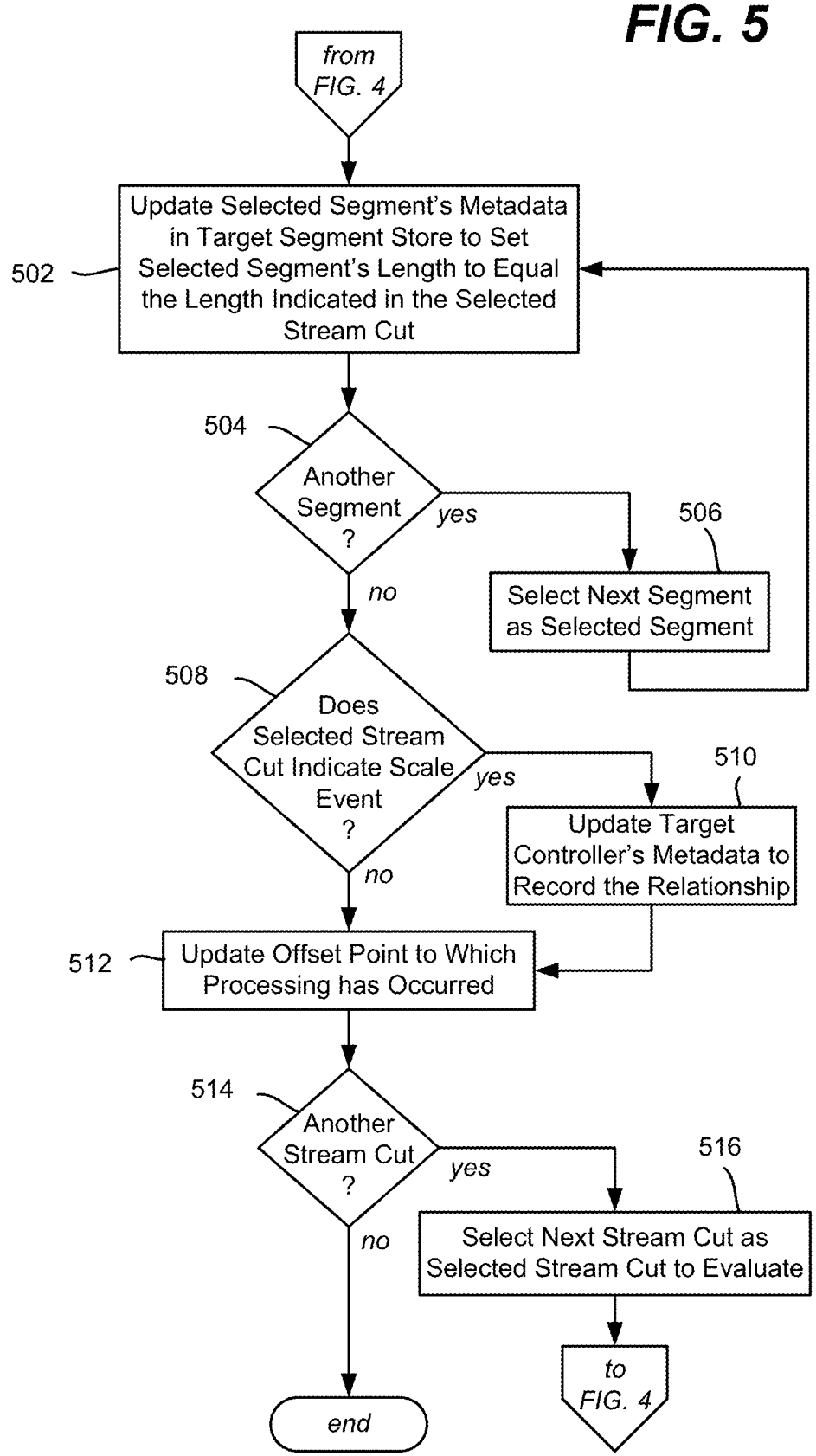

The block diagram of FIG. 2, in conjunction with the flow diagram of example operations in FIGS. 3-5, show an example of how a stream S (e.g., the data stream 112 at the source cluster 102) can be reconstructed on the target cluster.

Note that some component instances depicted in FIG. 2 are labeled 2xx to correspond to the component instances labeled 1xx in FIG. 1.

As represented by operation 302, a replicator 216 (FIG. 2) can be set up, typically by a client component 240 (FIG. 2) or the like (e.g., via an API call or the like to the target controller 218 or other system component) at the target cluster (but alternatively at the source cluster), to copy S's segments from the source cluster to the target cluster.

As represented by operation 304, the target controller 218 registers the stream S as being replicated from a remote cluster; (in one implementation, which source cluster provides the stream is not recorded, as the target cluster does not care where the stream is from; only the replicator 116 is concerned with copying from the source cluster). Thus, in one implementation only the fact that the stream S is a replicated stream needs to be registered, such as in the replicated stream configuration data. As represented by operation 306, the target controller 218 monitors (also referred to as "tails") the replicated S's stream cut segment 226 replicated to the target segment store 222 to watch for modifications and read them shortly after any modifications are made.

In this example, consider that the target controller 218 has processed the replicated stream cut segment 226 up to an offset P1 (initially P1 is zero (0)). Further, consider that the replicated stream cut segment 226 has been modified and its length has increased to P2 (where P2 is greater than P1). As represented by operation 308, the target controller 218 thus reads the stream cut segment's data between P1 and P2 to obtain one or more stream cuts.

Once the stream cuts are obtained, each stream cut (SCs) between P1 and P2 that the controller 218 has obtained is processed, in order, as represented starting at operation 310 which selects the first such stream cut as the selected stream cut for processing its data. The target controller's reconstruction process continues to operation 402 of FIG. 4.

Operation 402 of FIG. 4 extracts the set of segments (SEG) to which the currently selected stream cut refers. Operation 404 accesses the target segment store 222 to look up the Tier 2 identifiers and replicated lengths of each segment in the replicated segment set SEG. If, as evaluated at operation 406, any segment identified in the currently selected stream cut is missing from the replicated segment set SEG, the target controller's reconstruction process ends. Similarly, as evaluated at operation 408, if any replicated segment in the replicated segment set has a length smaller than that indicated in the currently selected stream cut, the target controller's reconstruction process ends. Note that operations 406 and 408 are performed because replication is unpredictable and some segments may be replicated faster than others.

If the segments identified in the currently selected stream cut are present and have lengths at least as large as the lengths indicated in the currently selected stream, each segment is the replicated segment set SEG is processed. To this end, operation 410 selects the first segment identified in the replicated stream cut set (SEG) as the currently selected segment $S_i$. The target controller's reconstruction process continues at operation 502 of FIG. 5.

Operation 502 of FIG. 5 updates the metadata $SM_i$ of the currently selected segment in the target segment store 222 to set the selected segment's length (which can be considered the target offset location) to be whatever the stream cut indicates, that is, $SM_i.Length:=S_i.Offset$. Operations 504 and 506 similarly set the lengths for the other segments in the set SEG.

Operation 508 evaluates whether the currently selected stream cut indicates a new predecessor-successor relationship (as a result of a scale event). If so, operation 510 updates the target controller's metadata to record that relationship.

At this point, the currently selected stream cut has been successfully processed. Operation 512 updates the offset P1 to point to the offset that is just after the currently selected stream cut stream cut.

Operations 514 and 516 repeat the target controller's reconstruction process for the next stream cut (of those chosen between the original P1 and P2), if any, until none remain. In this way, the replicated segments are updated to have lengths that match the latest stream cut, up to the stream cut where enough data (as evaluated by operations 406 and 408 of FIG. 4) has been replicated and is thus known to be consistent.

At this point, any reader may connect to the target cluster and read data up to the offsets specified in the stream cut, which equal the replicated segment lengths. The reader is limited to a view of the replicated data stream up to the stream cut point. Note that if any readers were actively tailing the replicated stream S and were awaiting more replicated data, such readers can be notified of the newly available events so that they may consume them.

Figure 6:
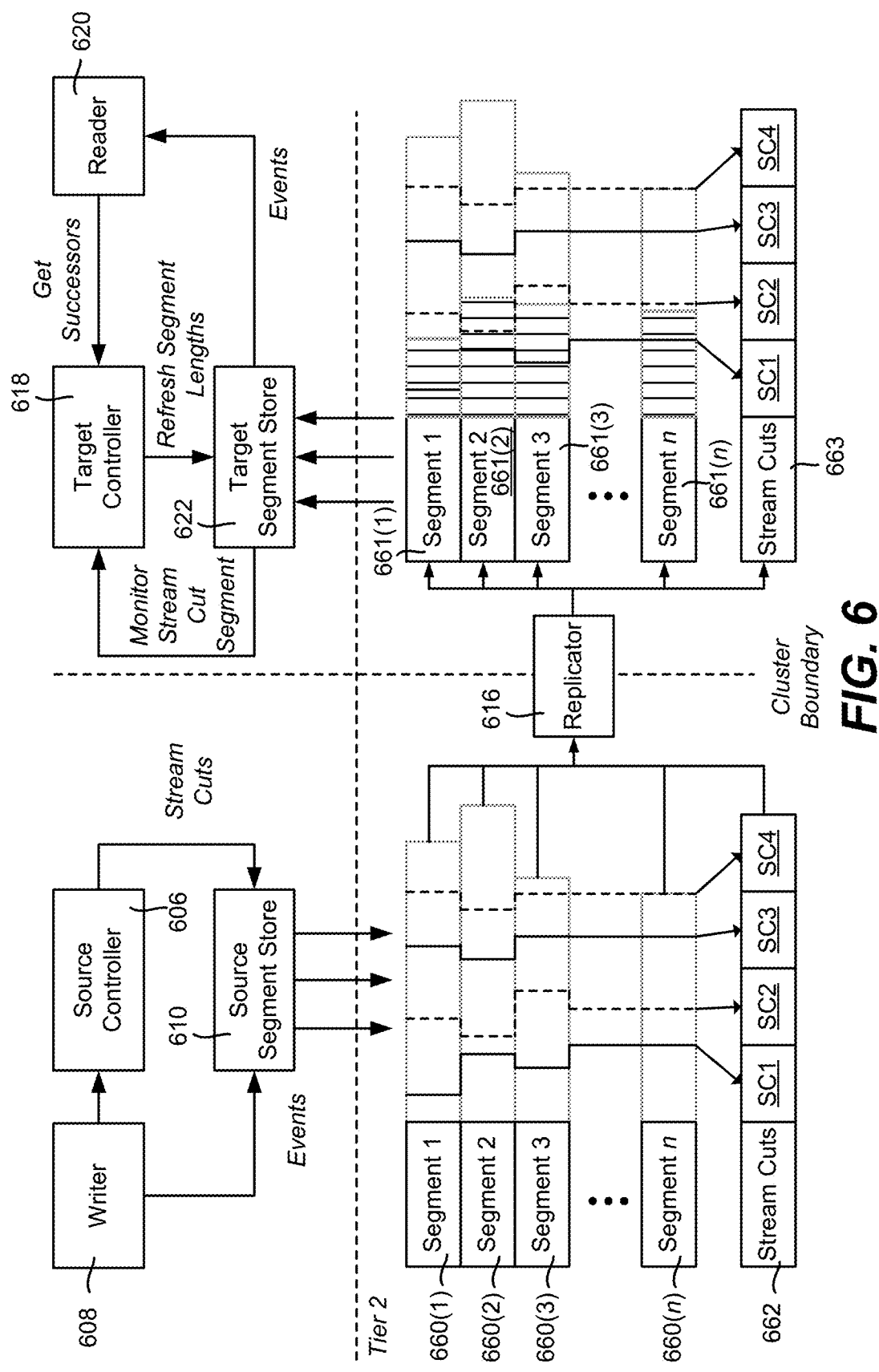
FIG. 6-9 are example representations of replicated stream data being made available for consistent reading based on stream cuts, as more data is replicated over time, in accordance with various aspects and implementations of the subject disclosure.
Figure 7:
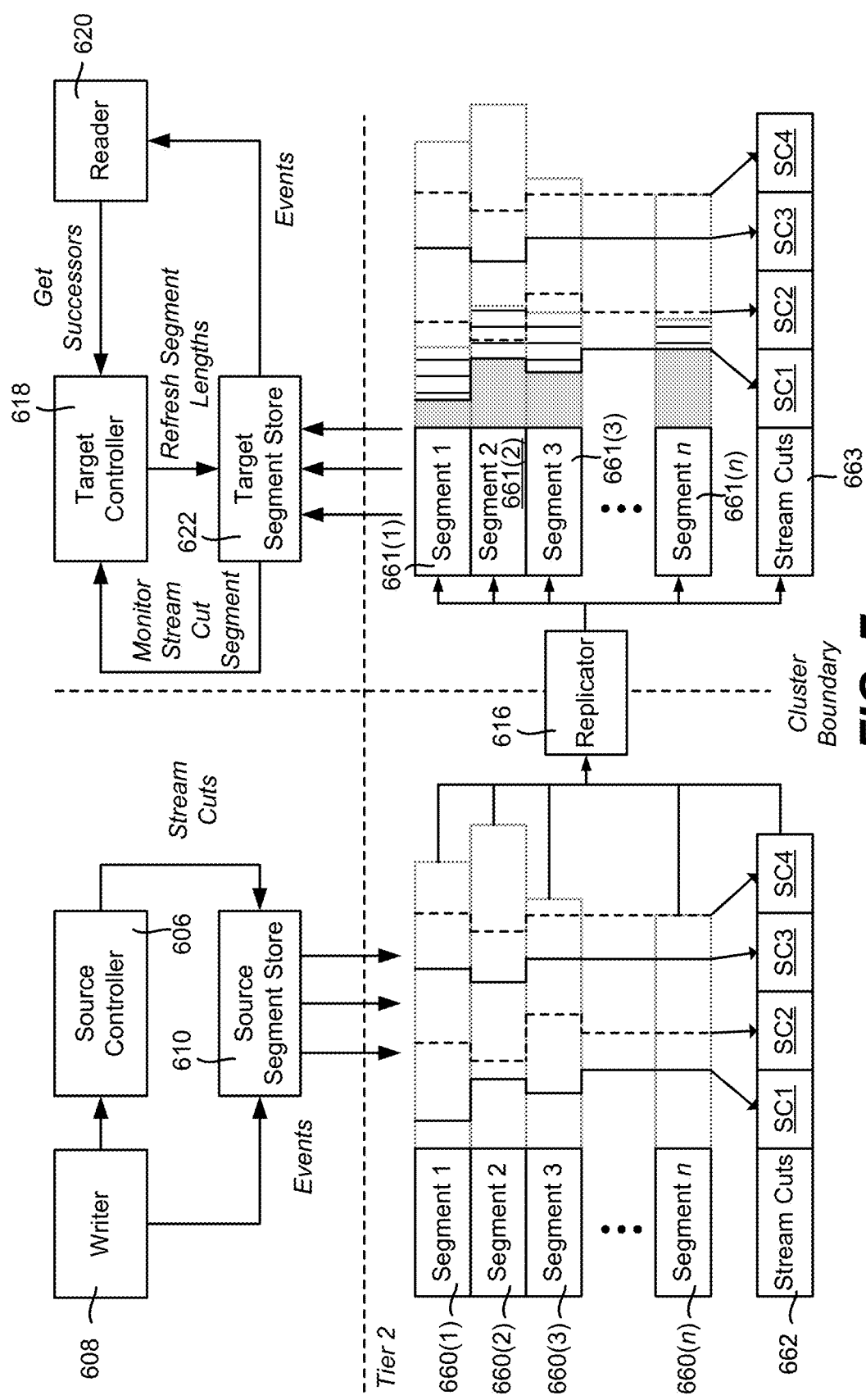
Figure 8:
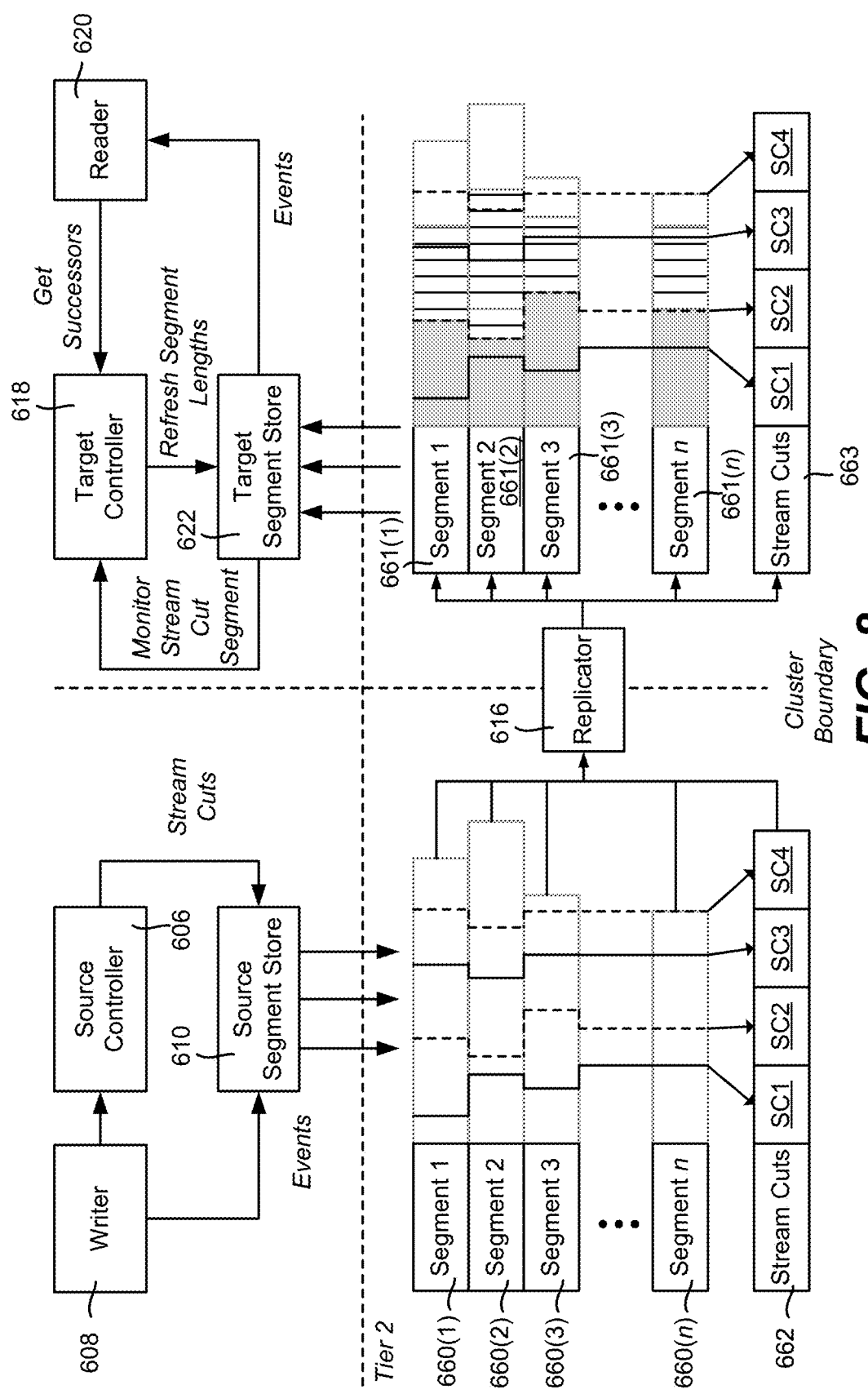

By way of an example as shown in FIGS. 6-8, consider that a stream comprising n segments 660(1)-660(n) is created on a source cluster, with events appended to the stream. The source controller 606 generates stream cuts and appends them to the stream cuts segment 662. In the example of FIGS. 6-8, there are four such stream cuts (SC1, SC2, SC3 and SC4, represented by the solid line, dashed line, solid line and dashed line respectively) generated so far; each of them splits the stream's segments in two parts.

The stream is to be replicated on a target cluster. Data replication is set up at Tier-2 storage using a replicator 616 (which can be a component provided by Tier-2 itself). The replicator 616 copies the data for each segment 660(1) through 660(n), and also copies the stream cut segment 662, shown during replication as (partially) replicated data segments 661(1)-661 (n) and replicated stream cuts segment 663, respectively. In FIGS. 6-8, the data that has been replicated is indicated by a lightly lined area of the segments; the area to the right of each lightly lined area represents data that has not yet been replicated. To reiterate, copying is performed in an unpredictable manner, e.g., the data of some segments may get ahead of others, and such replicator-based copying is not guaranteed to match stream cut/event boundaries.

The target controller 618 regularly (e.g., continuously) monitors (tails) the replicated stream cuts segment 663. Upon reading the stream cut SC1 from the replicated stream cut segment 663, the target controller checks the length of the replicated segments 661(1)-661 (n). Because there is sufficient replicated data up to the offsets pointed to by SC1, the target controller instructs the target segment store to recognize the SC1 segment offsets as the segment lengths.

As this point, as represented in FIG. 7, the data that has been replicated is indicated by the solid shaded area of the replicated segments 661(1)-661 (n) plus the lightly lined areas of the segments to the right of the shaded areas. However, only data in the shaded areas of the replicated segments 661(1)-661 (n), that is, up to the stream cut SC1, is made available for reading, because even though more data has been replicated, there is no guarantee that those events are consistent with one another, as they could be part of a larger transaction. Indeed, upon reading SC2, there is not sufficient data at the time represented in FIG. 7 to allow reads up to SC2, as such reads can be inconsistent.

Figure 9:
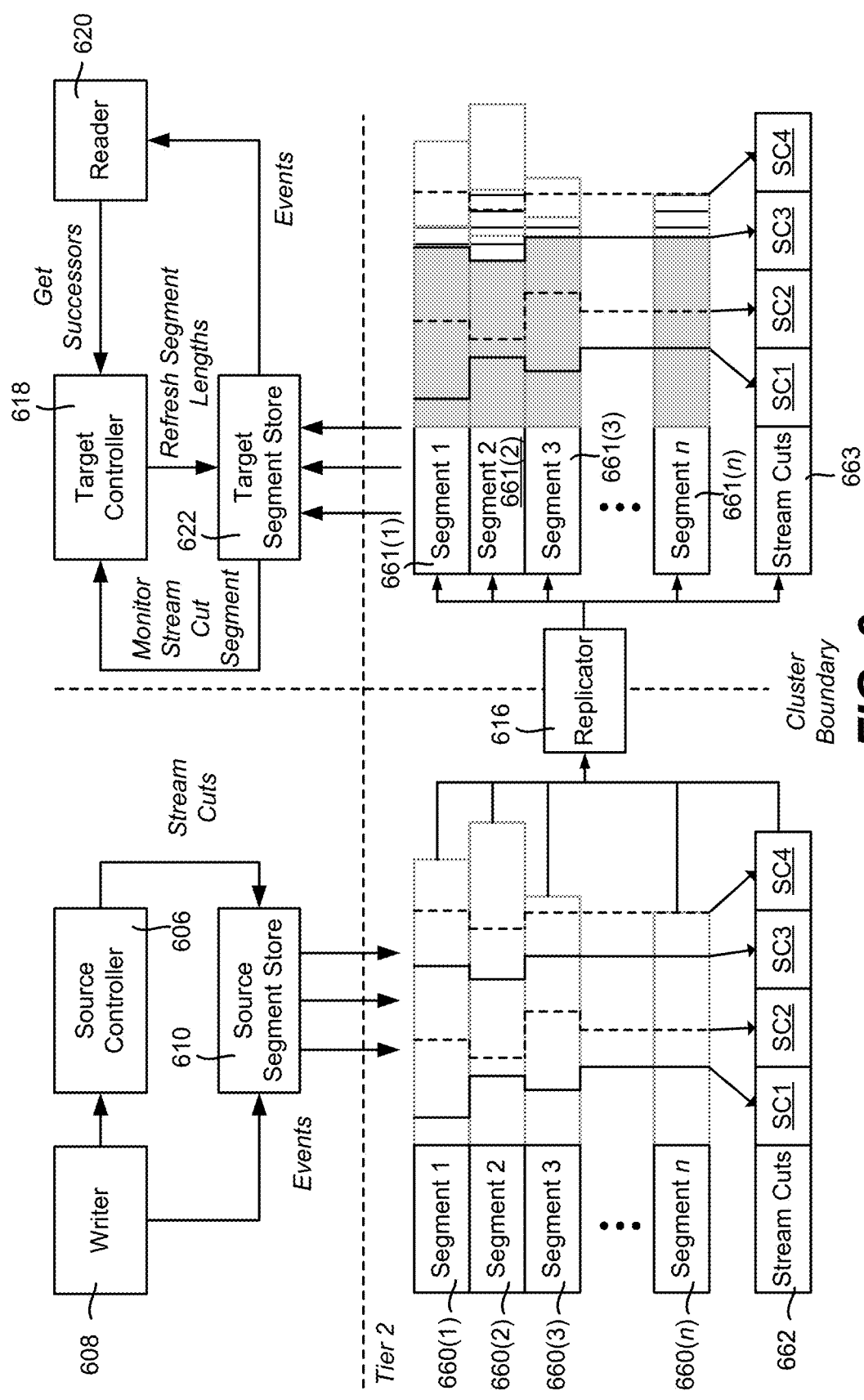

However, as more data is replicated at a later time as represented in FIG. 8, upon reading SC2, at least sufficient data beyond SC2 has been replicated, as represented by the updated solid shaded portions plus the updated lightly lined areas, and thus data up to the stream cut SC2 (as represented by the updated solid shaded portions) is now available for reading. As shown in FIG. 9, upon reading SC3, additional data as represented by the further updated shaded portions becomes available for reading.

When reading SC4, however, the target controller 618 determines that segments S1 and S3 have not been sufficiently/fully replicated up to the offsets specified by SC4 (the rightmost dashed line in FIGS. 6-9). As such, the target controller 618 does not make any more data available for reading because such data may not be consistent. The target controller 618 needs to wait for more replicated data to arrive in those segments S1 and S3 before the target controller can make the entire block of events up to SC4 visible.

Note that the target controller 618 may choose (e.g., periodically) to check the lengths of replicated segments S1 and S3 to thereby make more data available for reading once the lengths of the replicated segments S1 and S3 exceed the SC4 offsets.

Figure 10:
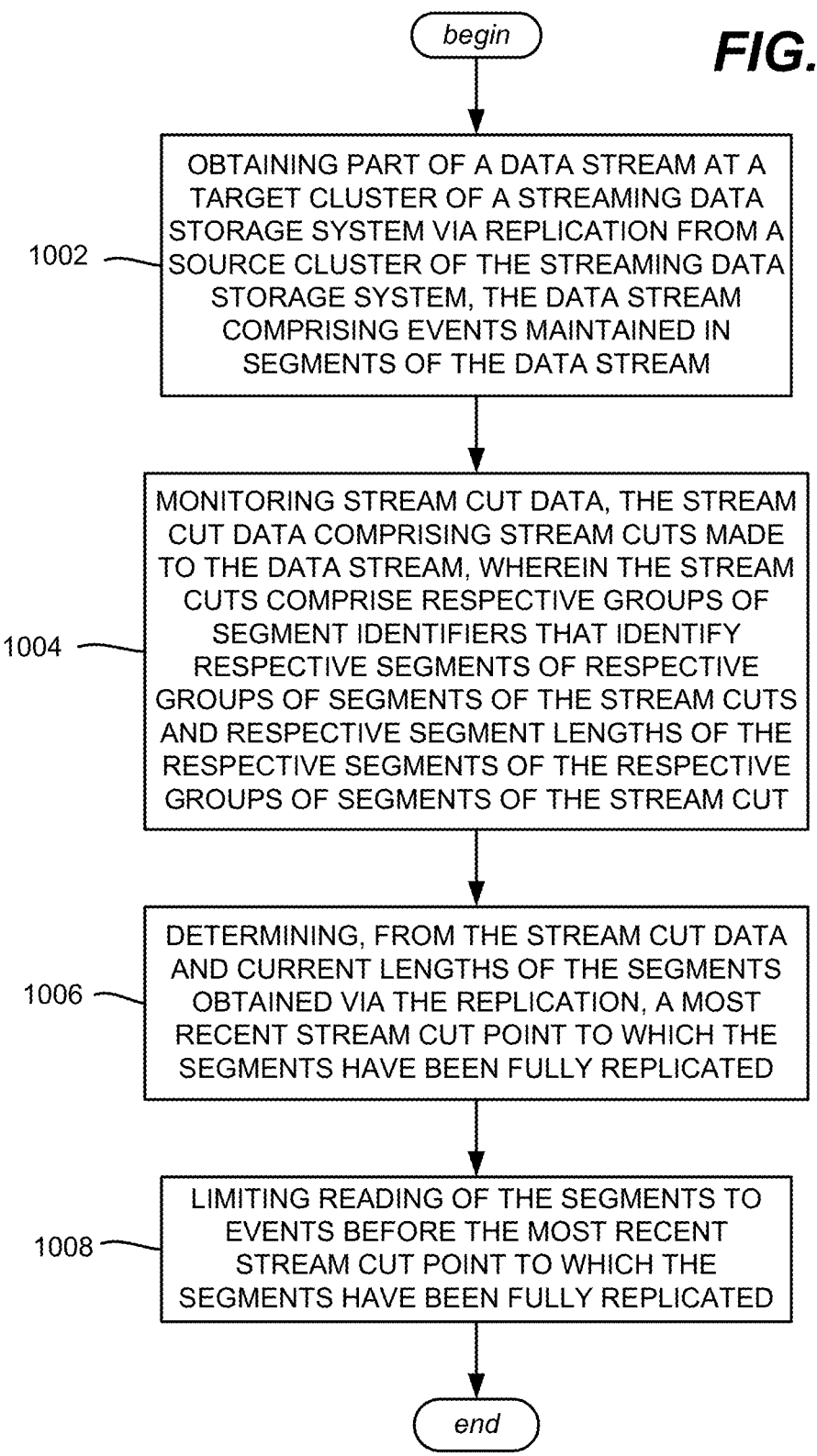
FIG. 10 is a flow diagram showing example operations related to limiting reading of replicated data to data that is fully replicated up to a stream cut, in accordance with various aspects and implementations of the subject disclosure.

One or more aspects can be embodied in a system, such as represented in FIG. 10, and for example can comprise a memory that stores computer executable components and/or operations, and a processor that executes computer executable components and/or operations stored in the memory. Example operations can comprise operation 1002, which represents obtaining part of a data stream at a target cluster of a streaming data storage system via replication from a source cluster of the streaming data storage system, the data stream comprising events maintained in segments of the data stream. Operation 1004 represents monitoring stream cut data, the stream cut data comprising stream cuts made to the data stream, wherein the stream cuts comprise respective groups of segment identifiers that identify respective segments of respective groups of segments of the stream cuts and respective segment lengths of the respective segments of the respective groups of segments of the stream cuts. Operation 1006 represents determining, from the stream cut data and current lengths of the segments obtained via the replication, a most recent stream cut point to which the segments have been fully replicated. Operation 1008 represents limiting reading of the segments to events before the most recent stream cut point to which the segments have been fully replicated.

Determining the most recent stream cut point to which the segments have been fully replicated can comprise comparing the current lengths of the segments obtained via the replication with the respective segment lengths of the respective segments of the respective groups of segments of the stream cuts.

Determining the most recent stream cut point to which the segments have been fully replicated can comprise determining whether the segments obtained via the replication exist relative to the respective segments, in the respective groups of segments of the stream cuts, identified by the respective groups of segment identifiers.

Further operations can comprise, at the target cluster, registering the data stream as a replicated data stream.

Further operations can comprise, determining whether a stream cut of the stream cuts is associated with a scale event that changes segment relationship data, and in response to determining that the stream cut is associated with the scale event, updating relationship metadata maintained at the target cluster.

Further operations can comprise, for identified segments that are identified in a most recent stream cut corresponding to the most recent stream cut point, updating corresponding segment length metadata in a target segment data store based on segment offsets corresponding to the identified segments in the most recent stream cut.

Limiting the reading of the segments to events before the most recent stream cut point can comprise limiting a read request based on the corresponding segment length metadata in the target segment data store.

Monitoring of the stream cut data of the stream cut data can comprise monitoring for a replication stream cut generated at the source cluster and replicated to the target cluster.

Monitoring of the stream cut data of can comprise monitoring for a stream cut of the stream cuts that was generated at the source cluster in response to a scale event.

The stream cut can be maintained in a stream cut segment associated with the data stream.

Figure 11:
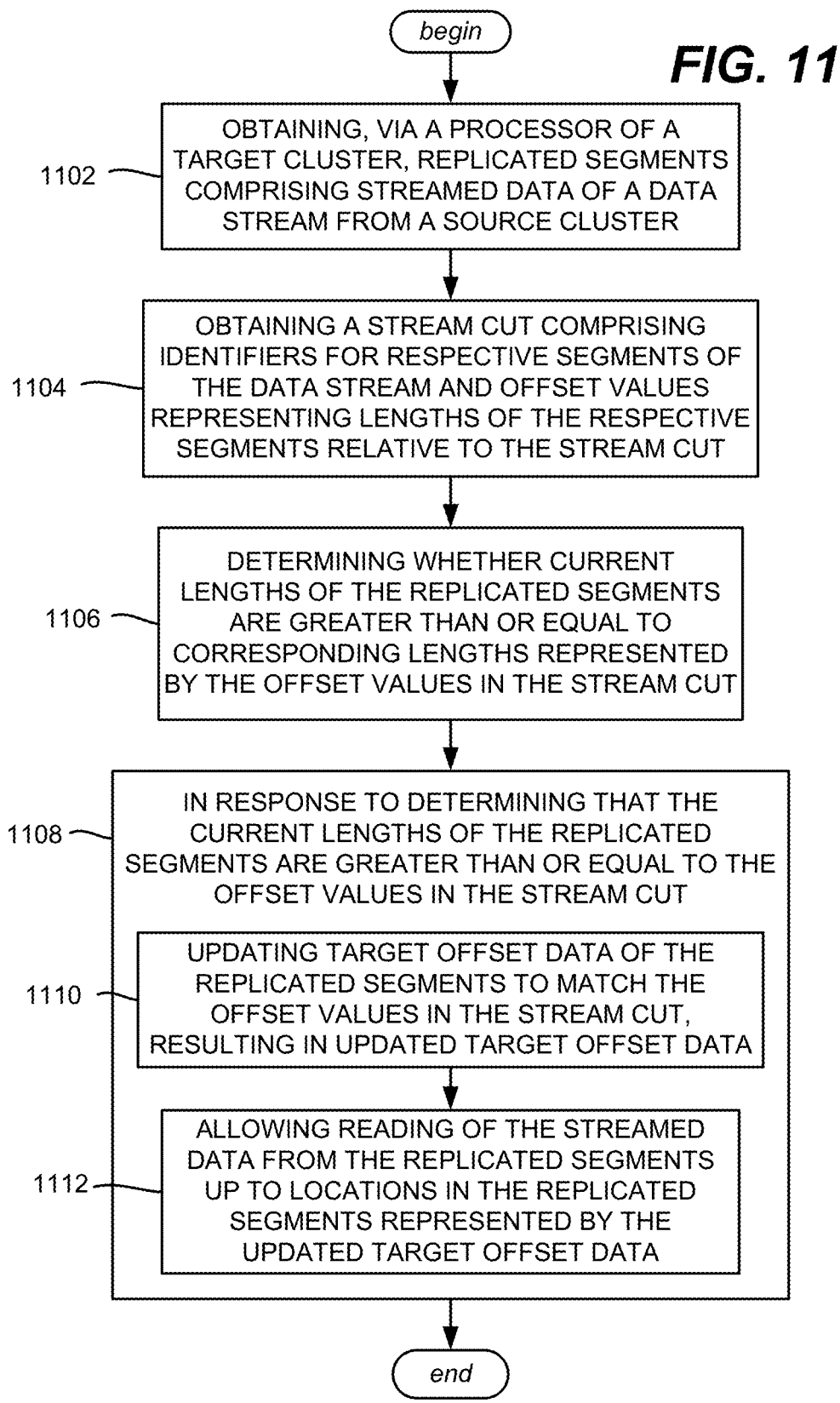
FIG. 11 is a flow diagram showing example operations related to allowing reading of replicated stream data based on lengths of replicated data stream segments, in accordance with various aspects and implementations of the subject disclosure.

One or more example aspects, such as corresponding to example operations of a method, are represented in FIG. 11. Operation 1102 represents obtaining, via a processor of a target cluster, replicated segments comprising streamed data of a data stream from a source cluster. Operation 1104 represents obtaining a stream cut comprising identifiers for respective segments of the data stream and offset values representing lengths of the respective segments relative to the stream cut. Operation 1106 represents determining whether current lengths of the replicated segments are greater than or equal to corresponding lengths represented by the offset values in the stream cut. Operation 1108 represents, in response to determining that the current lengths of the replicated segments are greater than or equal to the offset values in the stream cut, updating target offset data of the replicated segments to match the offset values in the stream cut, resulting in updated target offset data (operation 1110), and allowing reading of the streamed data from the replicated segments up to locations in the replicated segments represented by the updated target offset data (operation 1112).

The locations can be first locations in the replicated segments, and aspects can comprise, in response to determining that the current lengths of the replicated segments are less than the offset values in the stream cut, allowing the reading of the streamed data from the replicated segments up to second locations in the replicated segments represented by earlier target offset data that is based on offset values in an earlier stream cut prior to the stream cut in the data stream.

Obtaining the stream cut can comprise monitoring for modifications to a stream cut data structure maintained at the source cluster. Monitoring for the modifications to the stream cut data structure can comprise detecting a replication stream cut generated at the source cluster and replicated to the target cluster. Monitoring for the modifications to the stream cut data structure can comprise detecting a stream cut generated at the source cluster and replicated to in response to a scale event.

Figure 12:
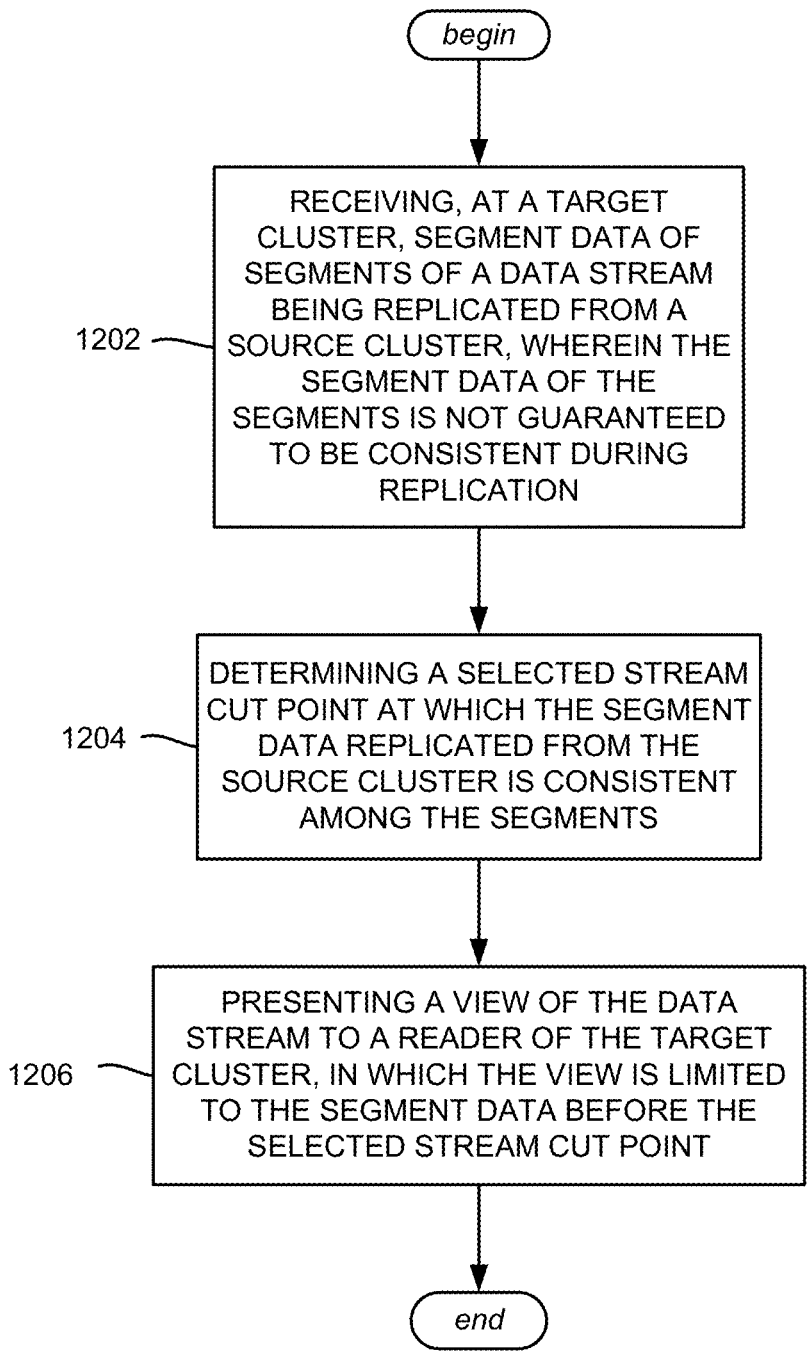
FIG. 12 is an example flow diagram showing example operations related to determining a stream cut point at which segment data replicated from a source cluster is consistent, and allowing reading of the replicated data up to that stream cut point, in accordance with various aspects and implementations of the subject disclosure.

FIG. 12 summarizes various example operations, e.g., corresponding to a machine-readable storage medium, comprising executable instructions that, when executed by a processor of a streaming data storage system, facilitate performance of operations. Operation 1202 represents receiving, at a target cluster, segment data of segments of a data stream being replicated from a source cluster, wherein the segment data of the segments is not guaranteed to be consistent during replication. Operation 1204 represents determining a selected stream cut point at which the segment data replicated from the source cluster is consistent among the segments. Operation 1206 represents presenting a view of the data stream to a reader of the target cluster, in which the view is limited to the segment data before the selected stream cut point.

Further operations can comprise monitoring for a change to replicated stream cut data.

The selected stream cut point can be an existing prior selected stream cut point, and further operations can comprise updating the selected stream cut point to a new selected stream cut point upon determining that the segment data replicated from the source cluster is consistent among the segments up to the new selected stream cut point, and presenting an updated view of the data stream to the reader application of the target cluster that includes segment data between the existing prior selected stream cut point and the new selected stream cut point, and is limited to the segment data before the new selected stream cut point.

Further operations can comprise notifying the reader that the updated view of the data stream is available for reading.

Further operations can comprise updating segment length data for replicated segment data that is consistent based on the determining the selected stream cut point.

As can be seen, described herein is a technology that facilitates replicating streams across cluster boundaries without losing consistency. The technology can be implemented regardless of a Tier-2 storage choice, and can rely on Tier 2's (e.g., geographic) replication capabilities. While Tier-2 storage need not understand streams or events (only bytes), the technology ensures that the replicated data can be used to correctly reconstruct a stream that is identical to the one at the source, and thus can be used for processing events that were originally written to the source stream. The technology is efficient and practical to implement.

Figure 13:
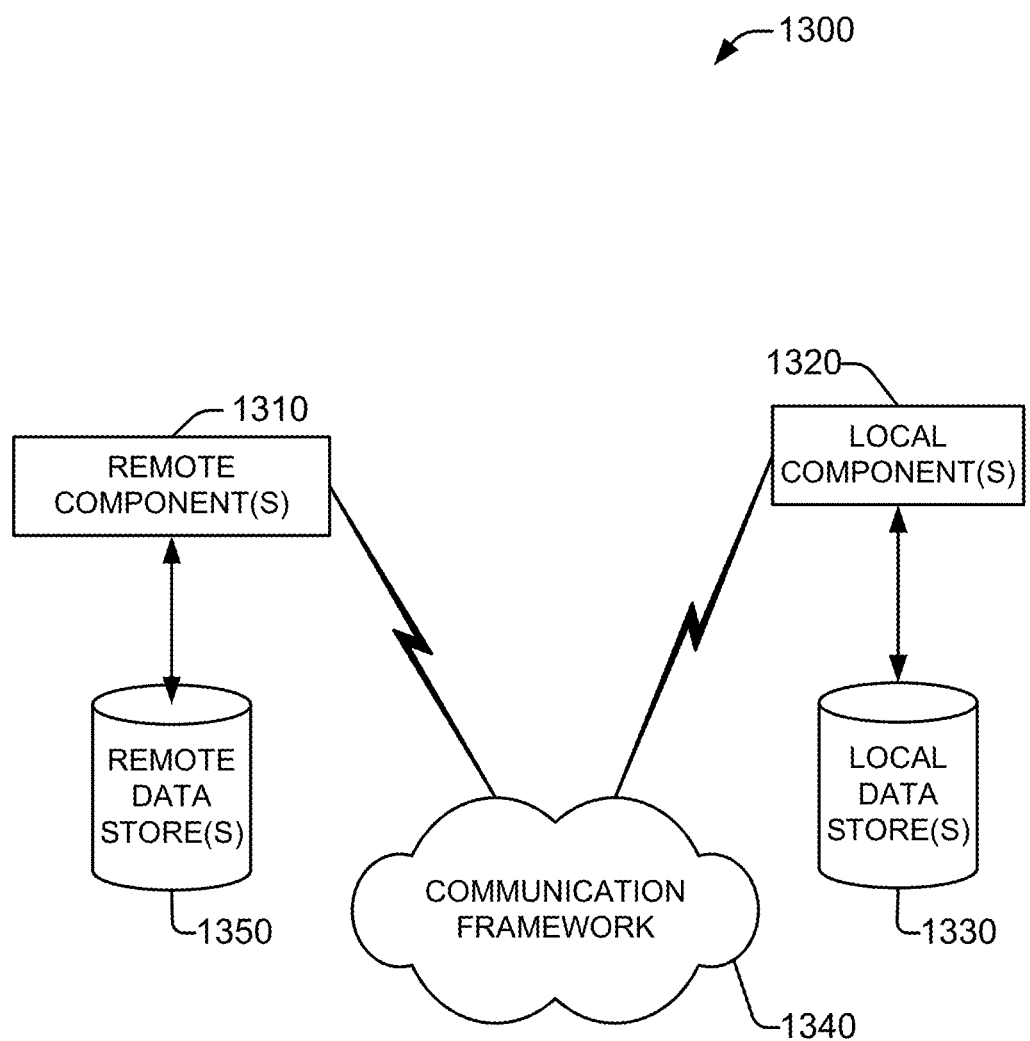
FIG. 13 is a block diagram representing an example computing environment into which aspects of the subject matter described herein may be incorporated.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
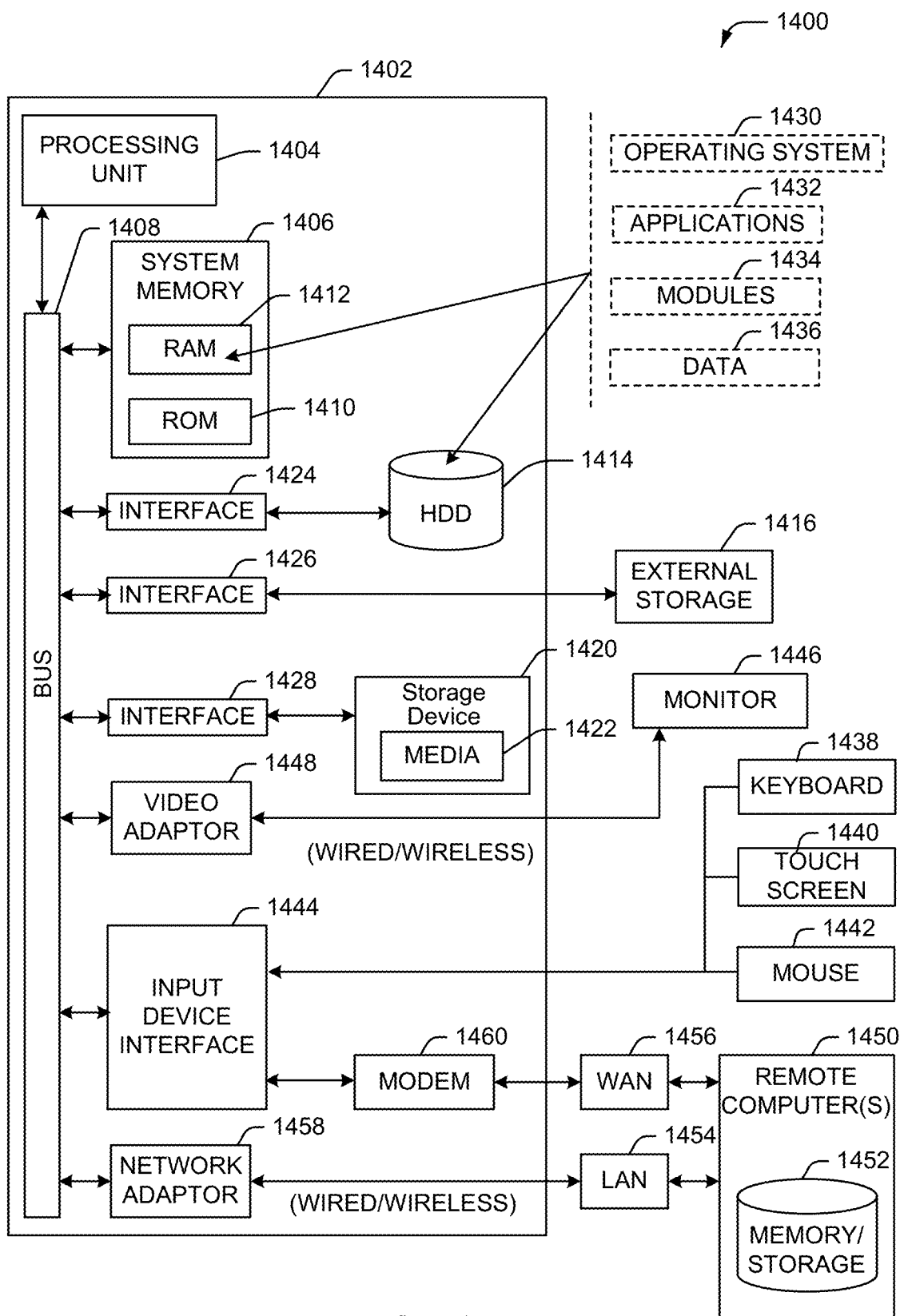
FIG. 14 depicts an example schematic block diagram of a computing environment with which the disclosed subject

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
   obtaining part of a data stream at a target cluster of a streaming data storage system via replication from a source cluster of the streaming data storage system, the data stream comprising events maintained in segments of the data stream, wherein the segments are parallel segments separating the data stream according to routing key values;
   monitoring stream cut data, the stream cut data comprising stream cuts made to the data stream, wherein the stream cuts comprise respective groups of segment identifiers that identify respective segments of respective groups of segments of the stream cuts and respective segment lengths of the respective segments of the respective groups of segments of the stream cuts, and wherein the stream cut data is stored via a stream cut segment of the data stream that is parallel to a segment of the segments;
   determining, from the stream cut data and current lengths of the segments obtained via the replication, a most recent stream cut point to which the segments have been fully replicated; and
   limiting reading of the segments to events before the most recent stream cut point to which the segments have been fully replicated.

2. The system of claim 1, wherein the determining the most recent stream cut point to which the segments have been fully replicated comprises comparing the current lengths of the segments obtained via the replication with the respective segment lengths of the respective segments of the respective groups of segments of the stream cuts.

3. The system of claim 1, wherein the determining the most recent stream cut point to which the segments have been fully replicated comprises determining whether the segments obtained via the replication exist relative to the respective segments, in the respective groups of segments of the stream cuts, identified by the respective groups of segment identifiers.

4. The system of claim 1, wherein the operations further comprise, at the target cluster, registering the data stream as a replicated data stream.

5. The system of claim 1, wherein operations further comprise, determining whether a stream cut of the stream cuts is associated with a scale event that changes segment relationship data, and in response to determining that the stream cut is associated with the scale event, updating relationship metadata maintained at the target cluster.

6. The system of claim 1, wherein operations further comprise, for identified segments that are identified in a most recent stream cut corresponding to the most recent stream cut point, updating corresponding segment length metadata in a target segment data store based on segment offsets corresponding to the identified segments in the most recent stream cut.

7. The system of claim 6, wherein the limiting the reading of the segments to events before the most recent stream cut point comprises limiting a read request based on the corresponding segment length metadata in the target segment data store.

8. The system of claim 1, wherein the monitoring of the stream cut data comprises monitoring for a replication stream cut generated at the source cluster and replicated to the target cluster.

9. The system of claim 1, wherein the monitoring of the stream cut data of comprises monitoring for a stream cut of the stream cuts that was generated at the source cluster in response to a scale event.

10. The system of claim 9, wherein the stream cut is stored as an event comprised in the stream cut segment.

11. A method, comprising:
    obtaining, via a processor of a target cluster, replicated segments comprising streamed data of a data stream from a source cluster;
    obtaining a stream cut comprising identifiers for respective segments of the data stream and offset values representing lengths of the respective segments relative to the stream cut wherein the segments are parallel segments separating the data stream according to routing key values, and wherein the stream cut is comprised in an event of a stream cut segment that is a parallel segment to the parallel segments of the data stream;

determining whether current lengths of the replicated segments are greater than or equal to corresponding lengths represented by the offset values in the stream cut; and in response to determining that the current lengths of the replicated segments are greater than or equal to the offset values in the stream cut,
updating target offset data of the replicated segments to match the offset values in the stream cut, resulting in updated target offset data, and
allowing reading of the streamed data from the replicated segments up to locations in the replicated segments represented by the updated target offset data.

12. The method of claim 11, wherein the locations are first locations in the replicated segments, and further comprising, in response to determining that the current lengths of the replicated segments are less than the offset values in the stream cut, allowing the reading of the streamed data from the replicated segments up to second locations in the replicated segments represented by earlier target offset data that is based on offset values in an earlier stream cut prior to the stream cut in the data stream.

13. The method of claim 11, wherein the obtaining the stream cut comprises monitoring for modifications to a stream cut data structure maintained via the stream cut segment of the data stream as replicated to the target cluster.

14. The method of claim 13, wherein the monitoring for the modifications to the stream cut data structure comprises detecting a replication stream cut generated at the source cluster and replicated to the target cluster.

15. The method of claim 13, wherein the monitoring for the modifications to the stream cut data structure comprises detecting a stream cut generated at the source cluster and replicated to the target cluster in response to a scale event.

16. A non-transitory machine-readable medium, comprising executable instructions that, when executed by a processor of a streaming data storage system, facilitate performance of operations, the operations comprising:
receiving, at a target cluster, segment data of segments of a data stream being replicated from a source cluster, wherein the segment data of the segments is not guaranteed to be consistent during replication, and wherein the segments of the data stream are parallel segments separating the data stream according to routing key values;
determining a selected stream cut point at which the segment data replicated from the source cluster is consistent among the segments, wherein the stream cut point is comprised in a stream cut event of a stream cut segment that is a parallel segment to the parallel segments of the data stream; and
presenting a view of the data stream to a reader of the target cluster, in which the view is limited to the segment data before the selected stream cut point.

17. The non-transitory machine-readable medium of claim 16, wherein the operations further comprise monitoring for a change to replicated stream cut data.

18. The non-transitory machine-readable medium of claim 16, wherein the selected stream cut point is an existing prior selected stream cut point, and wherein the operations further comprise updating the selected stream cut point to a new selected stream cut point upon determining that the segment data replicated from the source cluster is consistent among the segments up to the new selected stream cut point, and presenting an updated view of the data stream to the reader application of the target cluster that includes segment data between the existing prior selected stream cut point and the new selected stream cut point, and is limited to the segment data before the new selected stream cut point.

19. The non-transitory machine-readable medium of claim 18, wherein the operations further comprise notifying the reader that the updated view of the data stream is available for reading.

20. The non-transitory machine-readable medium of claim 16, wherein the operations further comprise updating segment length data for replicated segment data that is consistent based on the determining the selected stream cut point.

* * * * *